May 28, 1940. C. L. COLBERT 2,202,090
APPARATUS FOR MAKING ROOFING GRANULES
Original Filed May 27, 1937 2 Sheets-Sheet 1
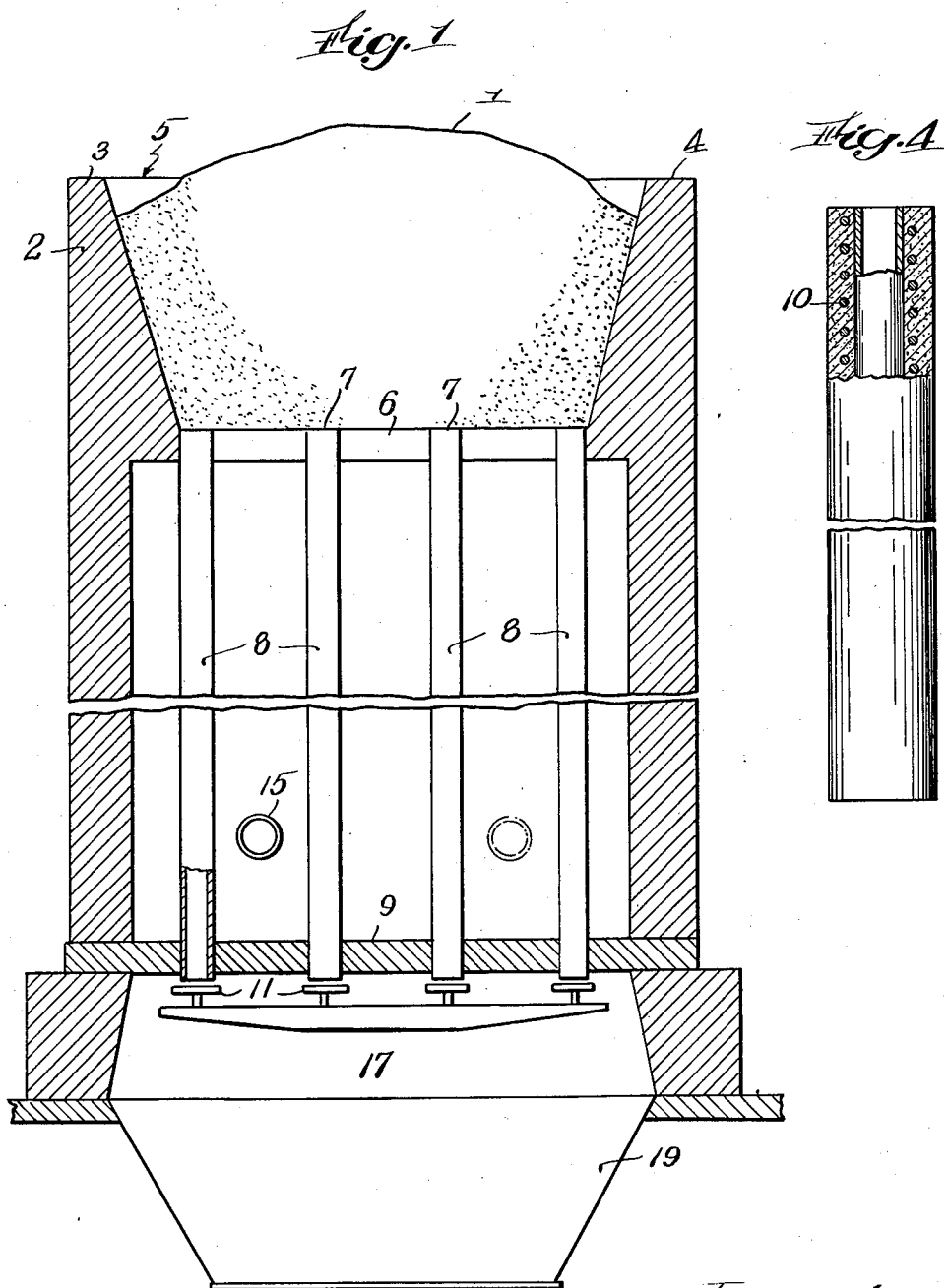
Inventor:
Clarence L. Colbert,
by Roberts, Cushman & Woodberry,
his Attys May 28, 1940. C. L. COLBERT 2,202,090
APPARATUS FOR MAKING ROOFING GRANULES
Original Filed May 27, 1937 2 Sheets-Sheet 2
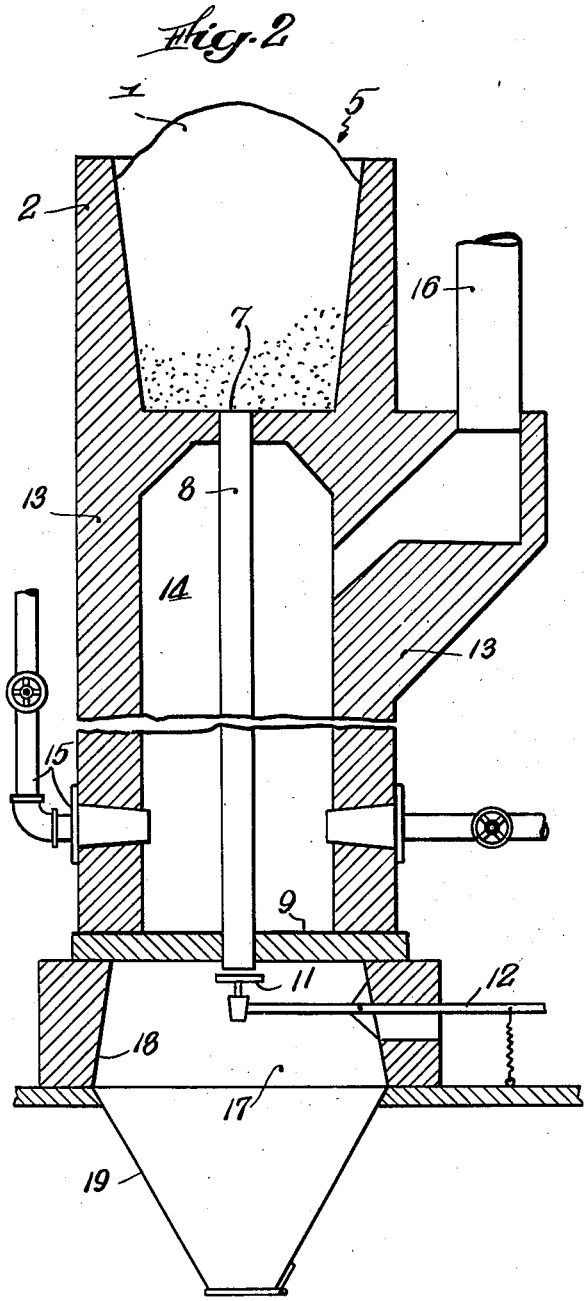
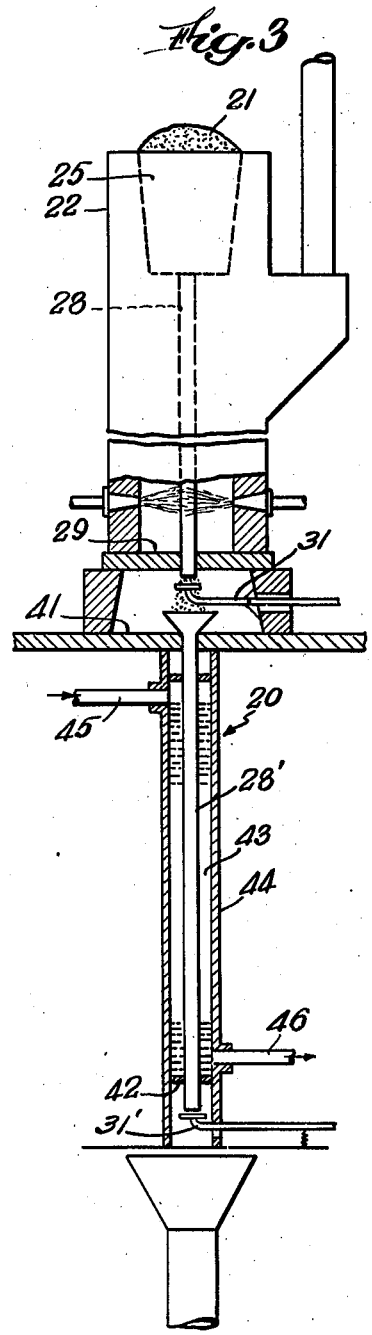
Inventor:
Clarence L. Colbert,
by Roberts, Cushman & Woodbury
his Attys.

Patented May 28, 1940

2,202,090

UNITED STATES PATENT OFFICE 2,202,090

APPARATUS FOR MAKING ROOFING GRANULES

Clarence L. Colbert, Elizabeth, N. J., assignor to Fiske Brick & Granule Company, Boston, Mass., a corporation of Massachusetts Original application May 27, 1937, Serial No. 145,083. Divided and this application June 16, 1938, Serial No. 214,170

5 Claims. (Cl. 263—29)

This invention relates to the preparation of granular materials, which are particularly suitable for decorative purposes such as application to sheet roofing and the like and to the improved product obtained.

In the manufacture of granular materials for roofing,— or "roofing granules," as they are usually called, it is necessary that they shall be made of weather-resisting substances or that they shall be rendered resistant to the weather in the course of manufacture. Accordingly, mineral substances are generally preferred, as the base, and those which are found in such condition that they may be reduced to granular forms of the desired size or sizes and of sufficient strength are selected.

The color of the mineral used may also influence its selection. But minerals which are of an appropriate color for roofing granules are relatively rare and expensive and in not a few instances the deposits of such minerals have been exhausted. On the other hand, of course if a dark or colorless granule is satisfactory some of the numerous dark-colored, gray or black minerals may be satisfactorily employed as such so far as the matter of color is concerned.

It therefore follows that if roofing granules are to be provided with color effects or appearances different from those of granules derived from the usual naturally-occurring dark minerals, they must be manufactured.

Various procedures have been followed in the prior art which consist in general of applying a colored coating to the surfaces of the dark-colored or uncolored granules, in order to give them a colored or brighter appearance. Such procedures have usually involved the application to the granules of a more or less fusible silicate to form a coating which is made to adhere to the granule by subjecting to a high temperature, sufficient to fix the coating. This is effective by passing it through a combustion furnace, in which the high temperature is provided by direct flame or direct impingement of the gases of combustion or the atmosphere upon the coated granules.

It is found, however, that roofing granules which are made in accordance with such processes are subject to "blooming," when they are applied to roofing and the roofing exposed to the weather. By "blooming" is meant a formation in or upon the surfaces of the granules which is different from the general consistency or color of the granules. Such formations on or in the surfaces of the roofing granules change the appearance of the roof as a whole. At the best, where this change in color is more or less uniform, the roof looks dull or pale, the color effect originally provided is destroyed, and the effort and expense of coloring the granules is defeated. But what usually happens is that the granules exhibit extreme variations in the degree to which they bloom. Consequently, some areas will remain colored while others will take on a bleached or stained or encrusted appearance, and these areas will make the appearance of the whole spotty or patchy, or streaky throughout the surface of the roof. The result is more undesirable than if no attempt had been made to provide color and a dark or gray mineral granule had been used in its natural state. This blooming effect or action may also occur on the under side of the granules and tend to offset or disrupt the adhesion of the granules to the surface of the roofing material to which it is applied, so that the granules become dislodged and fall off, leaving uncovered the corresponding surface of the roofing, which may be of an altogether different color or shade.

It is therefore an object of this invention to provide a method for the manufacture of a colored granule which shall not bloom, either spontaneously or upon exposure to the weather. It is also an object to provide a method of treating granular materials with silicates, whether colored or not, and to prevent the formation of bloom in the resulting product. A further object is to provide an improved coated or colored granule in which the coating or coloring material is firmly adherent to the granule and is stable in this respect against the action of weather. It is also an object to provide a granule which is bright-colored or of high color value and which does not become discolored or its surface altered either in appearance, or in structure,—on the exposed surfaces of the coated granules or on the surfaces of the granules which are applied to the roofing material. Other objects of the invention will appear from the following disclosure.

As a part of the present invention, it is found that granular materials which have been provided with a coating of an alkali metal silicate for the purpose of imparting color or other properties to the granules, and then subjected to furnace treatments are especially subject to "blooming." This effect may appear upon the granule immediately after being withdrawn from the furnace, upon cooling, or after the granules have been in storage or subject to weather conditions for some time. When the granules are applied to sheet roofing materials, as already pointed out, the "blooming" may occur only after the material has been applied to the roof and exposed.

It is further found as a part of this invention that such "blooming" of silicate coated granules is due to the presence of alkali metal silicates in the surface coating and that such silicates, in contact with the usual gases of combustion in the furnace or with similar gases, are reactive and are converted into corresponding salts of the alkali metal. These gases and salts will mingle more or less with the silicate surface. But they are not necessarily soluble nor uniformly miscible in the silicate and accordingly give rise to non-homogeneity of the coating. They do not promote adhesion of the coating to the granule surface which is coated or covered. They may and ordinarily do possess a different coefficient of heat expansion from either the granule or the silicate coating and in consequence set up strains between the two upon cooling and solidification of the coatings in which they are contained. At this stage they may also selectively crystallize out from the molten magma, thus presenting locally formed crystals throughout the silicate, giving the otherwise more or less clear or transparent silicate coating a white appearance, due to the diffusion of light, or if in lesser degree, a dulling or milky opalescent effect. But in either case they obscure any brilliant color effects which might otherwise be present therein.

This lack of homogeneity of the silicate coating persists or is increased as the coating solidifies. Consequently, although it might be expected that the inherently transparent, colored alkali silicate glazed coatings would be brilliantly colored, they are in fact dull and of relatively low color value.

In some cases,—perhaps when the silicate coated granules are quickly treated and the surface quickly cooled so that selective solidification and crystallization has no opportunity to occur, the finished granules may appear to have a clear, bright and brilliantly colored glaze coating.

But in both cases the coated granules are found to be still subject to deterioration upon exposure to the weather. This may be due to continued crystallization in the supercooled and hence somewhat fluid glass silicate. But it is also attributable to the action of moisture, sunlight, and attrition upon the soluble alkali metal salts which are disrupted, forming fissures into and even through the granule coating in which they are contained. When moistened, the soluble salts dissolve and the resulting solution comes out upon the exterior surface of the granule coatings and may spread over the surrounding roof and upon drying this area presents discolored, or white patches which are well known.

Since sodium silicate, for example, may possess a soda-silica ratio as low as 1:4 and still be soluble in water, and since such a composition upon mere evaporation will remain soluble in water, it is believed that a transformation, by chemical reaction, is effected when the residue of such a solution is heated to sufficiently high temperatures. It is known that such a soluble silicate coating may be rendered substantially insoluble by heat alone. One explanation of how this may occur is to consider that the sodium silicate is ionized in solution to sodium and silicate ions and that upon heating they lose their ionic charge upon the evaporation of water and at higher temperatures an appreciable part of the sodium is relatively free and capable of volatilizing while a part remains to combine chemically with the silica to form a more stable sodium silicate. This may also leave an excess of silica as free silicic acid, which gelatinizes and solidifies as a protective insoluble matrix for the whole.

If a free polyvalent metallic oxide is present, the excess of silicic acid may combine with it and forms silicates of such polyvalent metals which are in general more insoluble than the alkali metal silicates. In one process it is proposed to coat the granules first with finely-divided clay dust and then with a silicate solution. In such association the clay dust may be considered as alumina, which combines with the free silica, tending to form an alumino silicate, probably of both sodium (from the silicate solution) and potassium (from the clay).

In such association, however, the finely-divided clay on the granule surfaces to be coated not only will require prolonged heating at a very high temperature, especially to insure complete reaction between the clay and silicate but the clay particles will tend to adsorb air or other gases and hold it upon this surface and when the silicate is applied, will thus occlude a gaseous layer which will remain and thus render the inner or back surface of the coating cloudy and dull and not effectively adherent to the surface of the granule coated therewith. In so far as the clay may not be completely converted to silicate and dissolved or fused, it will make the inner surface of the granule light or white and if pigment is present, this will occlude and subdue the color effect of the pigment upon the appearance of the granule. At the same time the exterior portion of the alkali silicate coating will remain substantially unchanged in respect of its freedom to react with other reagents and gases.

On the other hand, it is found by the present invention that the free polyvalent metallic oxides are capable of reacting more readily with alkali metal silicates and/or the free silica in solution therewith, and to produce silicate compounds which are not only insoluble in water but which are clear and brightly colored.

It is also found that silicate coatings may be formed, which are of homogeneous composition and properties and are also free from such occluded gases, moisture or soluble salts as tend to produce immediate loss of color or subsequent blooming of the granules having such coatings,—even when subjected to the weather and like conditions for long periods of time.

In accordance with the present invention the granular material to be treated is first prepared of the desired size or range of sizes and from materials of sufficient initial strength or of such characteristics that they will develop the required strength during the process of treatment. If they are of the color desired for the finished granule, the coating to be applied may be of such composition and properties as to become and remain transparent. Or the color value of the granular material may lend tone or color value to the appearance of the coated granule, even if the coating is less than transparent or not entirely continuous or very thin.

In general it is to be recommended that the granules shall be free from surface dust or absorbed gases or moisture. This may be practically effected by using freshly crushed materials of clean fracture, or by washing and drying the granules. By subjecting the granules to an elevated temperature immediately before applying the coating composition, adsorbed gases, etc., may be expelled. Not that the granules should be hot when the coating composition is applied for this might cause the moisture of the coating composition to vaporize quickly on the hot surfaces forming bubbles of steam, which would prevent uniform wetting and coverage and thus defeat the purpose. But if the surfaces, freshly liberated from extraneous materials are promptly coated, they will be more uniformly coated and more intimately wetted than after prolonged standing or handling. It also follows that the original granule to be coated should be substantially free from components which would be reactive with the silicate coating, to form soluble products therewith, such as carbonates.

The coating composition is also preferably freshly prepared from a solution of sodium silicate or water glass, which has not been exposed to the air or to appreciable contact with gases or other materials which it might absorb (such as carbon dioxide, sulphur dioxide, etc.) and which is substantially free from other materials and, more particularly, soluble salts or reagents which might react to form them.

The granules are treated by mixing thoroughly with the silicate solution until their surfaces are thoroughly and uniformly coated with the solution.

If the granular material used is of the desired color, the alkali silicate may be used alone. But if color is to be imparted by the coating a suitable coloring agent will be added. This is usually referred to as pigment. It need not remain undissolved in the coating. Usually the coloring materials or pigments are insoluble in water, but they may dissolve in or combine with the silicate of the coating upon subsequent fusion. If such a result may be easily and completely effected, the pigment may be applied to the granules before they are coated. In this way the pigment may be depended upon to dissolve into the coating and present no difficulties by producing a lack of either adhesion to the granules or by interrupting the color and appearance of the finished, coated and colored granule, as described above with respect to other materials and procedures. If the pigment is more or less resistant to wetting, dissolving, or fusing into homogeneity, with the coating composition however, it may be best to mingle it with the fluid coating composition. Or, it may be desirable to apply the finely-divided pigment to the exterior surface of the coated granule and depend upon its penetration into and combination with the outer surface of the coating primarily, where it will receive the heating effect more immediately and certainly than when submerged by or suspended in the fluid coating and also impart a maximum color effect for a given amount of pigment employed.

The coated granules are fed promptly to a suitable heating device, wherein they are heated out of contact with active gases of any sort, being positively protected from combustion gases and also from appreciable contact with the atmosphere which may be and usually is contaminated with various reactive gases, as above mentioned, or solid impurities such as dust. The heat treatment will be such as to evaporate the water in which the silicate is dissolved, without intumescence, and may then completely fuse the residual silicate and/or pigment, as the case may be, and promote uniform adhesion of the coating to the granule surface and develop the homogeneity of the coating structure and of its outer surface. The pigment may not be fused at all, or may be fused in part only and yet, in either case, adequately and clearly impart its full color value to the coating, because it is immersed in and completely wetted by the enveloping transparent matrix of silicate, which in turn is both homogeneous and resistant.

Many polyvalent metallic oxides, when used as coloring agents, may react with the silica or silicate to produce corresponding silicates or double silicates which are not only of high, characteristic color value, but which are more inert, insoluble, and harder than any of the alkali metal silicates or solidified silicic acid. Thus the trivalent oxides such as $Cr^2O^3$, $Fe^2O^3$, are capable of such reaction,—or may remain as pigments and in either case are effective coloring agents. Pigments may also be separately prepared which require higher temperatures than those to which it is desirable to carry the silicate-coated granules, and these, when embedded in the transparent silicate coating, are effective to impart coloring thereto,—or they may dissolve in the silicate coating.

But coatings formed upon the granules in the manner described are free from non-homogeneity,—in their structure and contact with the granule surfaces to which they are applied,—which tends to defeat their color values. They are also free from mechanical disruption by moisture and other weather conditions and possess and maintain an enhanced color value over those which are not protected from intermingling with or the formation therein of more inactive, water-soluble salts or gases.

A given instance of practicing the invention will be described with reference to apparatus shown in the accompanying drawings, in which:

Fig. 1 is a front elevation and cross section of a roasting furnace;

Fig. 2 is a side elevation and cross section of the same in the plane of 2—2 in Fig. 1;

Fig. 3 is a side elevation of the roasting furnace as shown in Fig. 1, in combination with a cooling device for the continuous and direct operation of roasting and cooling the granules in a single pass; and Fig. 4 is a view of a modified form of heating element which may be used in the roasting furnace.

In carrying out the process, the granular material, which may be crushed slate or crushed shale or other appropriate material,—typically, crushed trap rock, is reduced to the desired size or range of sizes by crushing and screening, and washing, if necessary, to eliminate extraneous dust and fines and to leave clean surfaces on the granules to be treated. As thus prepared, the charge of granules (1) may be delivered onto the top of the furnace 2 and retained between the walls 3, 4 which form a hopper-like receiver 5. This may hold a large quantity or a shallow layer of granules, as desired. If the granules are moist it may be preferable to feed the granules gradually and spread them over the floor 6,—which constitutes the bottom of the hopper 5 and the top of the furnace 2,—and in a relatively thin layer so as to permit the ready evaporation and escape of moisture. The heat of the furnace will effectively serve to dry the granules in a short time. Alternatively, of course, the coated granules may be prepared and dried elsewhere and the already dried, coated granules delivered to the hopper 5, if desired.

Openings or passageways 7, suitably spaced, pass through the floor 6, which is otherwise gas-tight and sealed about the tubes 8. The openings are suitably shaped and disposed relative to the corresponding vertical tubes 8, which are also gas-tight and mounted in the furnace 2, to receive and conduct the granules from the floor or bottom of the charge in the hopper 5, in a continuous compact stream, by gravity, through the furnace, out of contact with the atmosphere or furnace gases. Additional means may be provided to effect this result, such as mechanical agitators or feeding arms (not shown). But a minimum of attrition upon or between the granules at this stage is recommended, and this is promoted by the vertical path and falling under gravity.

A convenient stage for the application of the coating composition to the granules,—especially when the granules require washing is while they are wet with water. In this order of procedure the granules will be already coated as they are fed to the hopper 5 and the coating will to an appreciable degree protect the surfaces from attrition and pulverizing action of agitation and feeding.

When the granules are delivered to the hopper 5 in dry or uncoated condition, the silicate coating composition may be applied to them by spraying or mixing the solution with them as they enter,—or by spraying and mixing the composition with the granules, in the hopper, by agitation. Hand-rabbling with wooden paddles will serve to mix the coating composition and granules and also to feed them to the openings 7, without contamination or crushing.

A typical and representative coating composition may consist of a solution of sodium silicate (in which the $Na_2O:SiO_2$ ratio is 1:3 or 1:4) and for the treatment of each 300 pounds of granules 9 pounds of silicate dissolved in about 10 pounds of water will prove sufficient for producing a substantially colorless transparent coating. If a red coating is desired approximately 4½ pounds of finely-divided ferric oxide may be added. For green coatings, 4½ pounds of chromic oxide may be added. Other colored metallic oxides may similarly be used and in like amounts. It is convenient to mix the coloring pigment with the silicate solution, in which it may be uniformly suspended but it may be distributed over the water-moistened or silicate moistened granules, as already described above, for similar or additional color effects.

The vertical tubes 8, which may be made of steel or iron, or of materials resistant to higher temperatures, if necessary, such as alloy steels or fire clay, are mounted to rest upon a bottom floor or plate 9. But the tubes conveniently pass through the floor 9 (which is otherwise gas-tight and sealed about the outsides of the tubes 8) and are provided with closure means at the lower ends, such as a pivoted trap-door or shutter arrangement 11, which may be positively operated from outside the furnace by suitable adjustment of the lever 12.

The granules flow by gravity through the tubes 8 and the rate of travel and hence the duration of their individual heat treatment, may be regulated by suitable adjustment of the closure means. The length and diameters of the tubes and accordingly the volume and cross section of the stream of descending granules will also be taken into consideration with the specific type of granule and coating which is under treatment. Likewise the furnace construction, temperature, and manner of operation desired for the result to be obtained may vary considerably. Thus, the heating of the tubes may be by means of electric heating units, such as resistance coils embedded in refractory covering 10, as shown in Fig. 4.

But in general, the cross section of the tubes will in no case be so small as to interfere with or prevent the free flow of the granules nor so large as to present serious variation in the heat treatment of the granules falling along the periphery of its inner wall and in the central part of the column of descending granules. A tube of 2 or 3 inches inside diameter, for example, is satisfactory for granules of 10 to 35 mesh. But it may be desirable and effective to provide a central rod or tube passing longitudinally of each tube (not shown) which will displace and thus prevent the formation of a more freely falling, central core in the column of granules and which may also be operated to facilitate and assure the continued and uniform progress of the annular column of granules through the tube, in a comparatively free fall, without appreciable attrition.

The bank of tubes 8 as thus provided are enclosed by the furnace walls 13, and the spaces between the tubes and within the walls comprise the heating chamber 14. This may be heated by gas or oil flames from the burners 15, as shown, or by suitable provision of a solid fuel burner, not shown. In either case the hot gases, as they pass through the combustion chamber to the flue 16,—will be distributed between the tubes and may impinge upon them uniformly throughout their length, or more directly at the top or middle or bottom portions as desired, according to the nature of the heating treatment, to which it is desired to subject the coated granules. If the granules are not thoroughly dried while on the floor 6 so that they retain some moisture as they enter the tubes 8, it will be undesirable to apply maximum heating effect at the top portions of the tubes, but to permit the temperature to rise gradually (and the moisture accordingly to escape gradually) as the granules descend. When the moisture is entirely expelled the granules may be then heated rapidly to the maximum desired. In treating granules coated with the silicate compositions as herein described, a maximum attained temperature of 1200° F. will be sufficient to develop a homogeneous, transparent colored coating, firmly adherent to the granules, and resistant to subsequent exposure to weather conditions. The period of treatment (e. g., fifteen minutes) should not be so prolonged as to promote appreciable cohesion between the granules. This may in general also be avoided by applying a relatively thin coating to the granules, by continued, fairly rapid movement of the granules through the tubes and by cooling promptly after the required temperature and heat treatment effect has been secured to make the coating homogeneous, adherent, and of the desired color, structure or consistency.

Such cooling may be effected simply by discharging the granules from the tubes 8 into a cooling chamber 17, at the bottom of the furnace, as shown in Figs. 1 and 2. The granules in this chamber are, however, protected from the air and furnace gases by hermetically closed walls 18 until thoroughly cooled. They may then be withdrawn (through the leg 19) and the solidified, homogeneous, insoluble surfaces which they then present are inert and resistant to the conditions of subsequent use, such as the application of them to sheet roofing materials and the conditions of handling, transportation, storage, laying on the roof, weather, and the like.

Nevertheless, if a purified, dried, and cooled air is used, this may be safely passed into and through the cooling chamber 17 to accelerate cooling and without deleterious effect upon the coated granules but rather to assist in cooling their outer surfaces promptly and to prevent cohesion between them, if this tends to occur.

In such treatment, the silicate coating as applied to the granule surface, in clear or water-moist condition, intimately and completely wets it. And if the granule has been treated with a finely-divided pigment (also liberated from occluded gases or other impurities by heat, washing or like treatment) the silicate solution will likewise wet and occlude the finely-divided pigment freely and completely. If the granule is dusted with such pigment after coating with silicate, on the outer surface, it will be wetted and adhere but will not introduce impurities into the coating. Likewise, when the pigment is mixed with the silicate solution.

As the solution-coated granule dries, the silicate forms a uniform, continuous, homogeneous, adherent coating which may thereafter be fused but is not subsequently disrupted or altered in its physical structure or appearance. Whether the pigment may be on the granule surface, throughout the coating, or on the outer surface of the coating layer of silicate, it is wetted by the silicate and hence does not diffuse the light, but reflects light of its own color through the silicate surface. It may also, at higher temperatures, partly or completely combine with the silica or silicate to form a more stable, more resistant compound silicate, having characteristic color and properties of its own. To such extent as this occurs the coating is improved and becomes more homogeneous, inert and permanent.

If the cooling of the granules is not satisfactorily effected by cooling, en masse, as they come from the furnace, this may be effected by the device shown in Fig. 3, in which a furnace as shown in Figs. 1 and 2 is superimposed upon a cooler 20.

In this device the granules 21 are fed from the hopper 25 through tubes 28 in the furnace 22 and out through the bottom of the furnace 29, as above described. But the lower ends of the tubes 28 may be extended through or may feed into separate, corresponding tubes 28', passing through a floor 41 and thence through a lower floor 42. The floors 41 and 42 are sealed to the outsides of the tubes passing through them and are spaced apart to form an enclosed chamber 43, having water or gas-tight walls 44. The chamber 43 is provided with means at 45 such as a blower for delivering a cooling medium such as water or air through it, between the tubes 28', and from the chamber at 46,—thus chilling the tubes and the granules contained in them, promptly and effectively to the desired temperatures.

In this arrangement, the roasting furnace may be constructed and arranged as described with reference to Figs. 1 and 2. The rate of feed of granules may be controlled by closures 31, or by similar closures 31' at the lower ends of the cooler tubes 28',—or at both points in their progress through the apparatus.

The space between the floor 29 and the floor 41, or the floors themselves, may be insulated to prevent transmission of heat from the furnace to the cooler,—or the space may be ventilated, if dry inert gas is used, and thus make it accessible to the operator.

When the granules have been passed successively and directly through the furnace and through the cooler, they may be delivered directly to the atmosphere since they will then be wholly inert and resistant to atmospheric conditions.

By either course of procedure, the granules produced are free from decomposition or reaction products of the sodium silicate which are soluble in water and the sodium silicate is itself converted to a much more homogeneous form, both with respect to its adhesion to the granules, its structure, its surface, and its color and general appearance, as well as its permanency, strength and resistance to subsequent chemical reaction.

This application is a division of my copending application Serial No. 145,083, filed May 27, 1937.

I claim:

1. Apparatus for treating granules, comprising means for conducting a continuous stream of granules through a heating tube, out of contact with gases reactive therewith, said heating tube having an inlet and an outlet only, for the passage of said granules, and being otherwise without opening, said tube being sufficiently small in cross section to assure a substantially uniform treatment of the granules and sufficiently large to permit the travel of a substantially continuous stream of the granules, means for regulating the temperature of said granules in said tube, and means for removing the granules from said tube and cooling the same, out of contact with gases reactive therewith.

2. Apparatus for treating granules, comprising means for conducting a continuous stream of the granules through a tubular chamber, out of contact with gases reactive therewith, said tubular chamber having an inlet and an outlet only, for the passage of said granules and being otherwise without opening, said chamber being sufficiently small in cross section to assure a substantially uniform treatment of the granules and sufficiently large to permit the travel of a substantially continuous stream of the granules, means for heating the granules during the first part of their passage therethrough, and means for cooling the granules during the latter part of their passage therethrough.

3. Apparatus for treating granules, comprising means for conducting a continuous stream of the granules through a tubular chamber, out of contact with gases reactive therewith, said tubular chamber having an inlet and an outlet only, for the passage of said granules and being otherwise without opening, said chamber being sufficiently small in cross section to assure a substantially uniform treatment of the granules and sufficiently large to permit the travel of a substantially continuous stream of the granules, means for heating the granules during the first part of their passage therethrough, means for cooling the granules during the latter part of their passage therethrough, and means for regulating the rate of flow of said granules.

4. Apparatus for treating granules, comprising means for conducting a continuous stream of the granules through a tubular chamber, out of contact with gases reactive therewith, said tubular chamber having an inlet and an outlet only, for the passage of said granules and being otherwise without opening, said chamber being sufficiently small in cross section to assure a substantially uniform treatment of the granules and sufficiently large to permit the travel of a substantially continuous stream of the granules, means for heating the granules during the first part of their passage therethrough, means for cooling the granules during the latter part of their passage therethrough, and means for regulating the temperature of heating and temperature of cooling of said granules.

5. Apparatus for treating granules, comprising means for conducting a continuous stream of the granules through a tubular chamber, out of contact with gases reactive therewith, said tubular chamber having an inlet and an outlet only, for the passage of said granules and being otherwise without opening, said chamber being sufficiently small in cross section to assure a substantially uniform treatment of the granules and sufficiently large to permit the travel of a substantially continuous stream of the granules, means for heating the granules during the first part of their passage therethrough, means for cooling the granules during the latter part of their passage therethrough, and means for regulating the rate of flow of said granules, and means for regulating the temperature of heating and temperature of cooling said granules.

CLARENCE L. COLBERT.